June 6, 1961  E. H. FRIEDMAN  2,987,590
PLUGS SUITABLE FOR FUNCTIONING WITH A SELF TIMER AND ALSO
FOR SUPPORTING A TESTING BULB FOR TESTING
PHOTOGRAPHIC FLASHLAMPS AND CIRCUITS
Filed Jan. 25, 1960

INVENTOR.
ERWIN H. FRIEDMAN
BY
*William Wolfe*
ATTORNEY

# United States Patent Office 2,987,590
Patented June 6, 1961

2,987,590
PLUGS SUITABLE FOR FUNCTIONING WITH A SELF TIMER AND ALSO FOR SUPPORTING A TESTING BULB FOR TESTING PHOTOGRAPHIC FLASHLAMPS AND CIRCUITS
Erwin H. Friedman, 200 E. 8th St., Brooklyn 18, N.Y.
Filed Jan. 25, 1960, Ser. No. 4,340
4 Claims. (Cl. 200—51)

This invention relates to an electrical system tester and self timer adapter and more particularly to a simple attachment for photographic cameras and flash units including the flash bulb.

In many instances, it is desirable to test the operativeness of photographic lamps and batteries along with the continuity of the flash circuit and its allied circuits, such as the multiple flash and shutter solenoid circuit. At times, it is also desirable to take a photograph with the aid of a self timer.

Various types of devices for testing circuits and flashlamps have been proposed which operate with great precision. These devices usually have elaborate housings, containing switches, buttons, resistors, additional circuits, wire and cable. However, the object of the present invention is chiefly to provide a simple inexpensive attachment of insignificant size that is insertable into the various outlets of a flash unit and adaptable to the existing circuits and equipment and does in no way affect any physical change to them.

In addition, as there is no known device for gauging visually the adjustment of a self timer pin, the present device combines with the self timer adapter a visual gauging means whereby the self timer can be pre-set.

Another feature heretofore unobtainable is the ability for a solenoid operated camera to take a flash photograph with the aid of a self timer.

An object of the invention is to provide a device or plug which can be used in conjunction with a self timer to electrically motivate the taking of a flash photograph by operating the shutter solenoid and flash unit simultaneously.

A further object is to provide a device having a visual gauging means to permanently pre-set the travel distance of the self timer pin so when inserted into the adapter, electrical contact will be established.

A further object is to provide a device which can function both with a self timer and also be used to hold a flashlamp testing bulb.

I accomplish these and other objects by providing an electrical circuit and flashlamp testing and self timer adapter device, comprised of a dielectric body and two electrical contact blades, and said body having two openings positioned transversely to the direction of the blades, and each said opening extending from the outside of the body to the blade further removed therefrom, said blades partially embedded in the body and partially extending therefrom and the said part extending therefrom being suitable for insertion into the various outlets of a flash unit and said part of said blades within the body each having a hole therethrough; said holes in the blades being aligned with the holes in the body so that a testing lamp and self timer can be inserted through the holes in the body passed through and contact one blade and contact the other blade whereby an electrical shunt is provided.

For further comprehension of the invention and of the objects and advantages thereof, reference will be had to the following description, the accompanying drawing and to the appended claims in which the various novel features of the invention are more particularly set forth.

In the accompanying drawings forming a material part of this disclosure:

Figure 1:
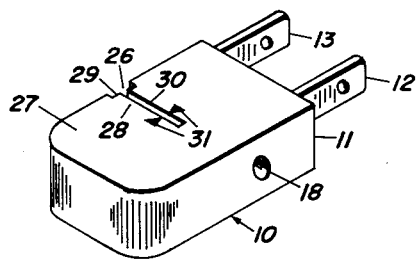
FIG. 1 is a perspective view of the testing device and self timer adapter embodying the invention.
Figure 2:
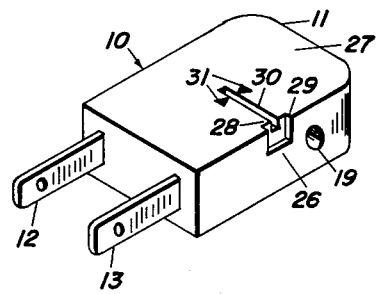
FIG. 2 is a view similar to FIG. 1, looking in the opposite direction.
Figure 3:
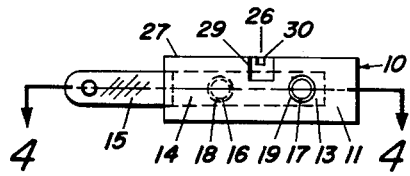
FIG. 3 is a longitudinal side view of the device shown in FIG. 1 and FIG. 2.

Referring to the drawings in which like numerals indicate similar elements, my device 10 is comprised of a dielectric body 11 and electricity conducting contact blades 12 and 13, said blades being spaced apart and being longitudinally positioned in respect to the body 11 and each blade having a portion 14 firmly embedded in the body and a portion 15 extending outwardly therefrom and said outwardly extending portion being suitable for insertion into the various outlets on a flash unit. The embedded portion of blade 12 having a hole 16 therethrough and the embedded portion of blade 13 having a hole 17 therethrough and said holes not being aligned. The portion 14 of the blades being of such a thickness that the holes 16 and 17 can be threaded if desired.

Although the drawing shows the body to be formed of plastic material and in one part as by molding it could be formed in halves or segments and the several parts permanently assembled in any suitable manner, and the body can be formed of rubber or any other suitable dielectric material.

The body 11 is provided with two holes 18 and 19 extending inwardly from opposite sides. The said hole 18 being aligned with the hole 16 in blade 12 and the said hole 19 being aligned with the hole 17 in blade 13, both said holes extending inwardly from the opening to the blade furthest removed.

Figure 4:
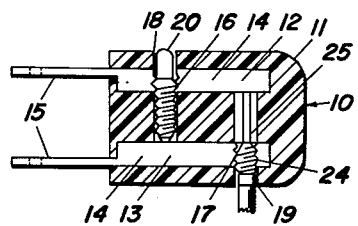
FIG. 4 is a sectional view taken along line 4—4 of FIG. 3, showing device functioning with testing lamp and self timer.
Figure 5:
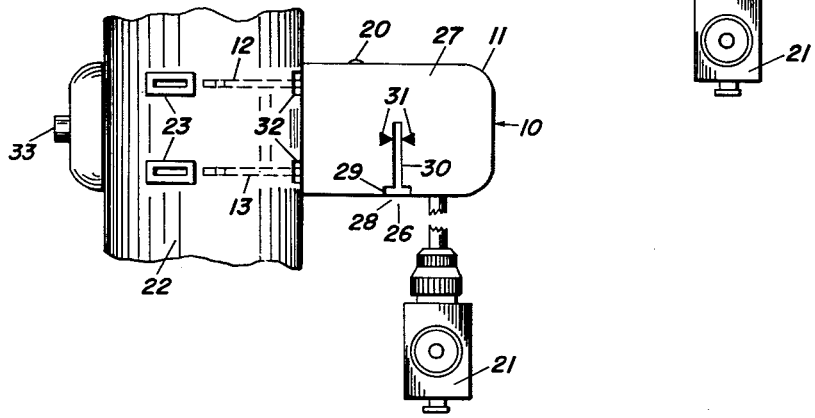
FIG. 5 is a side view of the device shown inserted into the flash unit remote control outlet and having a testing lamp protruding upwardly and self timer extended downwardly from the invention.

In FIG. 4 and FIG. 5, the device 10 is shown equipped with a testing lamp 20 and a self timer 21. The testing lamp 20 is inserted in and extends through the hole 18 in the body and through hole 16 in blade 12 which it contacts with one of its terminals and its other terminal contacts blade 13 forming a shunt across the contact blades. Thus when the device or plug 10 with the lamp 20 in position is inserted into the remote control outlet 32 of the flash unit 22 (FIG. 5) the circuit is closed when the flashlamp (not shown) is in functioning position and the testing lamp 20 lights up to show that the flashlamp is seated properly making good electrical contact, batteries are working and flashlamp is good and will flash. If the device 10 is inserted in the auxiliary outlet 23 the auxiliary circuit can be tested by pressing the flash unit operating button 33 which would light the testing bulb 20. It should be realized that this testing device can be inserted in any outlet and will function as a shunt across the circuit and test its functionability in the same way as has been shown above in the testing of the remote control and auxiliary circuits.

The self timer 21 when in the functioning position is inserted in and extends through the hole 19 in the body and rests with its threaded shoulder 24 screwed into hole 17 of the contact blade 13 and its functioning pin 25 extending toward the contact blade 12. When the self timer functions, the pin 25 travels from its retracted position outwardly and strikes the blade 12 and makes electrical contact therewith. As the pin 25 and the threaded shoulder 24 are in electrical contact with each other, they too combine to shunt the remote control circuit of the flash unit and fire the flashlamp and operate the shutter solenoid simultaneously.

To permit a self timer to be adjusted for use with the device 10, a setting gauge 26 is provided along one edge and the upper surface 27 of the body 11. The setting gauge 26 is provided with a cut out portion 28. This cut out portion extends transversely across the plug and is shaped with an enlarged outer diametral portion 29 and a decreased diametral portion 30. The portion 29 is of the proper size to bear the threaded shoulder 24 of the timer, and the diametral portion 30 to bear the pin 25 of the timer. On the surface 27 of the plug 11 there is a mark 31 which indicates a distance away from the enlarged outer diametral portion 29 which is equal to the distance between contact blades 12 and 13 so that when the self timer 21 is placed with its threaded shoulder 24 in the opening 28 the length of travel of the pin can be visually adjusted to conform to the distance between the contact blades 12 and 13 by setting the adjusting device on the timer when the pin end reaches the mark 31. This permits the timer to be adjusted to the device to insure repeated establishment of necessary electrical shunt when inserted into the plug, avoiding over or under travel of the self timer pin 25 and possible malfunctioning of the self timer.

In the drawing and the description heretofore, the contact blades have been shown and described to each have a hole therethrough and the body with openings on either side so that the lamp 20 and the self timer 21 are inserted from opposite sides of the body, but it should be realized that the contact blades could be formed with two holes in one blade and no holes in the other blade and with both holes in the body on the same side so that the lamp 20 and self timer 21 can be inserted at the same side of the body and extended through the holes in one blade and contact the other blade.

It should be understood that while I have illustrated and described the preferred embodiment and one variation of my invention, I do not limit myself to the precise construction herein disclosed and the right is reserved to all changes and modifications coming within the scope of the invention as defined in any of the appended claims.

Having thus described my invention, what I claim as new, and desire to secure by United States Letters Patent is:

1. An electrical circuit and flashlamp testing and self timer adapter device, comprised of a dielectric body and two electrical contact blades, and said body having two openings positioned transversely to the direction of the blades, and each said opening extending from the outside of the body to the blade further removed therefrom, said blades partially embedded in the body and partially extending therefrom and the said part extending therefrom being suitable for insertion into the various outlets of a flash unit and said part of said blades within the body each having a hole therethrough; said holes in the blades being aligned with the holes in the body so that a testing lamp and self timer can be inserted through the holes in the body passed through and contact one blade and contact the other blade whereby an electrical shunt is provided.

2. A device as described in claim 1 wherein the body is provided with a gauging means formed in and on the upper surface of the body said gauging means being comprised of a larger opening continuous with a diametrically longer and narrower opening and a marker on the body adjacent to the narrower opening and removed from the larger body by a distance equal to the distance between the contact blades whereby a timer can be inserted in the opening with its threaded shoulder in the larger opening and its pin extending into the smaller diameter opening to visually set and adjust the travel of the self timer pin.

3. An electrical circuit and flashlamp testing and self timer adapter device, comprised of a dielectric body and two electrical contact blades, and said body having two openings positioned transversely to the direction of the blades, and each said opening extending from the outside of the body to the blade further removed therefrom, said blades partially embedded in the body and partially extending therefrom and the said part extending therefrom being suitable for insertion into the various outlets of a flash unit and said part of said blades within the body each having a hole therethrough; said holes in the blades being aligned with the holes in the body, said holes in the body extending inwardly therefrom, one from each side of the body, so that a testing lamp and self timer can be inserted through the holes in the body passed through and contact one blade and contact the other blade whereby an electrical shunt is provided.

4. A plug suitable for supporting a self timer comprised of a dielectric body and electrical contact blades, said body having an opening therein and said blades being spaced apart and having a portion embedded in the body and a portion extending therefrom suitable for functioning in an electrical outlet and one of said blades in its embedded portion having an opening therethrough aligned with the opening in the body, and said body being provided with a gauging means formed in and on the upper surface of the body, said gauging means being comprised of a larger opening continuous with a diametrically longer and narrower opening and a marker on the body adjacent to the narrower opening and removed from the larger body by a distance equal to the distance between the contact blades whereby a timer can be inserted in the opening with its threaded shoulder in the larger opening and its pin extending into the smaller diameter opening to visually set and adjust the travel of the self timer pin, and whereby a self timer can be inserted so that its shoulder will be in intimate relation with one of the electrical contact blades and its pin when extended can contact the other electrical contact blade and function to shunt a circuit.

References Cited in the file of this patent

UNITED STATES PATENTS

| 2,108,708 | Foster | Feb. 15, 1938 |

FOREIGN PATENTS

| 879,464 | France | Nov. 19, 1942 |
| 1,119,020 | France | Mar. 26, 1956 |